Aug. 19, 1969  K. W. KOEHNLEIN ET AL  3,461,623
ICE SKATE BLADE HONER
Filed Sept. 14, 1967  2 Sheets-Sheet 1
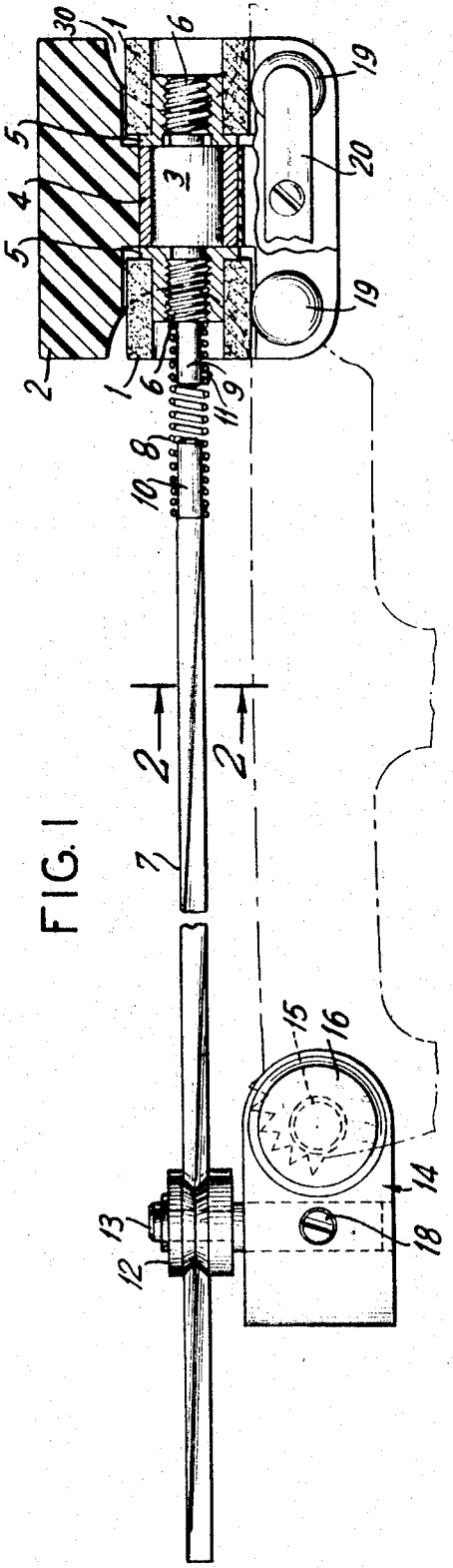
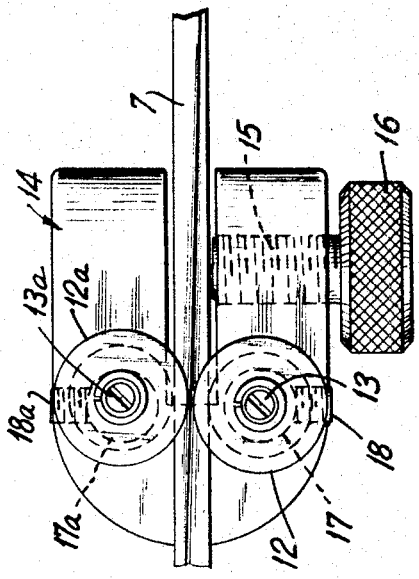
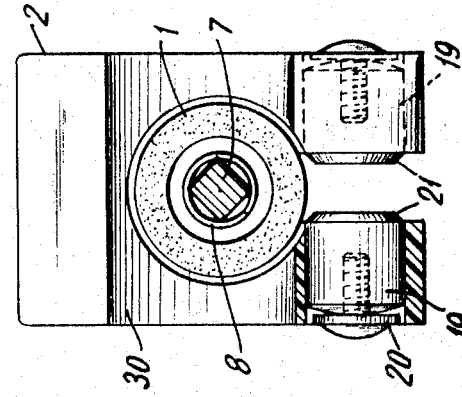
INVENTORS
KURT W. KOEHNLEIN
HERBERT R. KLENCK
BY
*Hopgood & Calimafde*
ATTORNEYS

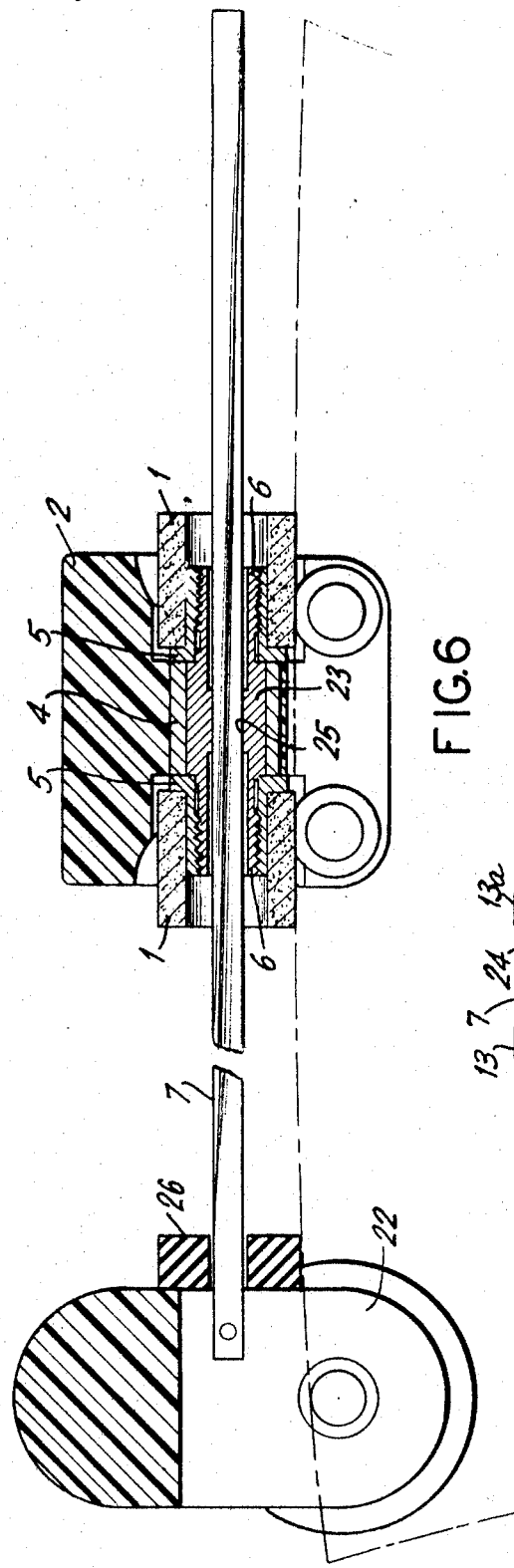
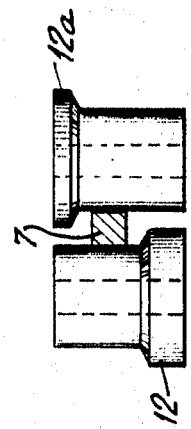
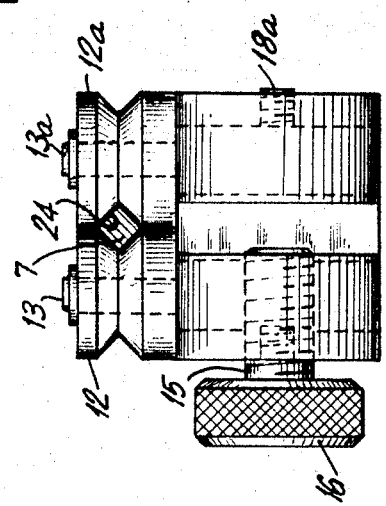

United States Patent Office 3,461,623
Patented Aug. 19, 1969

3,461,623
ICE SKATE BLADE HONER
Kurt W. Koehnlein, 42 DeHaven Drive, Yonkers, N.Y. 10703, and Herbert R. Klenck, 108—07 103rd Ave., Richmond Hill, N.Y. 11418
Filed Sept. 14, 1967, Ser. No. 667,850
Int. Cl. B24b *19/00, 23/00*
U.S. Cl. 51—241                 11 Claims

ABSTRACT OF THE DISCLOSURE

A cylindrical honing stone rotatably attached to a retaining carriage which, in operation, is slid back and forth along the blade edge. A twisted rigid rod similar to the type utilized to spin a child's top, is employed to rotate the stone as the carriage is moved along the blade. A flexible link joins the stone and rod to permit the stone to follow the curved blades employed by figure skates.

BACKGROUND

The invention is in the field of blade sharpeners; and more specifically ice skate blade sharpeners.

There are in use ice skate blade sharpeners which employ honing stones, which are designed to sharpen as they are slid along a blade. As such blades are concave across the face, the stones must be shaped so as to preserve this contour.

A major problem encountered with existing sharpeners is loss of stone contour, evidenced by ridges developing in the stone from wear due to sliding it along the blade under moderate pressure during the sharpening process. These ridges overlap the blade edges and thereby distort them. Consequently it is an object of this invention to eliminate this ridging of the stone without necessitating the reduction of pressure thereon by forceably causing the honing stone to rotate as it is slid along the blade.

SUMMARY OF INVENTION

The invention is comprised of a cylindrical honing stone which is rotatably mounted to a carriage by which it is slid along the blade. A twisted rod of rectangular cross section oriented along the blade, provides a plurality of parallel cam surfaces, which are utilized in conjunction with followers or guides to translate the lateral motion of the carriage into rotary motion of the stone. The stone can be attached to the followers, or to the rod when stationary guides are used.

The twisting action imparted to the stone by the invention keeps it properly dressed and avoids the aforementioned undesirable ridging. Proper dressing of the stone contributes to the production of an overall blade sharpness and shape superior to that achieved by similar prior art devices.

Other objectives, advantages, and various further features of novelty and invention will be pointed out or will occur to those skilled in the art from a reading of the following specification in conjunction with the accompanying drawings.

BRIEF DESCRIPTION OF THE DRAWINGS

FIG. 1 is a partially cut away side view of the honer.

FIG. 2 is an end view of the carriage assembly taken along line 2—2 of FIG. 1.

FIG. 3 is a plan view of the cam guide rollers and clamp assembly.

FIG. 4 is an end view of the cam guide rollers and clamp assembly.

FIG. 5 illustrates an alternate form for the guide rollers.

FIG. 6 is a partially cut away view of an alternate embodiment of the invention.

DESCRIPTION OF THE PREFERRED EMBODIMENTS

Referring now to FIG. 1, there is shown an upturned phantom skate blade upon which the invention is resting. In this position, the honing element 1 is resting upon the concave surface of the blade. It is supported there by carriage 2 to which it is attached through spindle 3. Spindle 3 rides inside of bearing 4. The honing element 1 is comprised in this instance of 2 cylindrical honing stones, each of which is cemented to a flanged nut 5. The nuts 5 are screwed onto the threaded ends 6 of spindle 3, coming to rest so that the flanges thereof abut the ends of bearing 4, thus restraining the stones and spindle against lateral displacement within the housing, but freely permitting the spindle assembly to rotate.

The spindle assembly is flexibly coupled to cam rod 7 through spring 8. The cylindrical forward end 9 of the spindle assembly, and the opposing cylindrical end 10 of rod 7 share a common outside diameter complementary to the interior diameter of spring 8, so that when assembled spring 8 is frictionally retained thereon. In addition, lock pin 11 may be inserted through spindle extension 9 to further inhibit separation of spring 8.

Drive cam rod 7 is a rigid rod of rectangular cross section, twisted so that its surfaces rotate from ¼ to ½ turn over the length of the skate blade, the amount of such twist being determined by the length of the blade. The helical surfaces produced by twisting the rod provide a means of translating movement of the carriage along the blade into rotary action of the stones as follows.

Referring now to FIGS. 1, 3, and 4, rod 7 is supported at the end opposite the carriage by drive cam guide rollers 12 and 12a which ride on parallel axles 13 and 13a. Axles 13 and 13a are adjustably attached to the body of clamp 14. Clamp 14 lies across the end of the blade and is tightly secured thereto by set screw 15. Set screw 15 is actuated by knob 16. With clamp 14 attached to the blade, axles 13 and 13a are supported in a position perpendicular to the blade edge, and adjustably set apart a distance equal to substantially the sum of ½ the diameter of rollers 13 and 13a. Cylindrical extensions 17 and 17a of axles 13 and 13a, respectfully, fit into complementary bores in clamp 14 and are retained in position therein by set screws 18 and 18a. The lonigtudinal axis of axle 13a is parallel to but offset from the longitudinal axis of extension 17a, creating an eccentric for adjustment of the distance between the roller axles, and consequently of tension between the rollers.

FIG. 4 illustrates the V shape of the peripheral grooves about the guide rollers, which form a generally square orifice 24 when they are placed side-by-side. The orifice 24 exactly matches the cross section of the twisted drive rod, so that the rod will be forced to rotate as it is pushed through the orifice during the lateral sharpening stroke.

FIG. 5 illustrates an alternate form of the guide rollers with straight sides, which would permit some vertical movement of the rod during the sharpening process. This rotation is imparted to the honing element through flexible link 8.

Flexible link 8 is employed to permit the rotational axis of the spindle and honing element to depart from the rotational axis of the drive rod, in order that the stone may be maintained flush with a curved blade, e.g. such as the blade employed on figure skates.

FIGS. 1 and 2 illustrate the guiding feature of the carriage assembly. The carriage and the honing element are aided in maintaining a proper portion with respect to the skate blade by two opposing matching sets of Teflon guide plugs 19. The plugs 19 are cylindrical and ride in complementary bores in the carriage housing. On each side of the carriage, one plug is attached to each end of flat spring 20. Flat spring 20 as attached substantially at its center point to the carriage by screw 20a, and is so shaped that as thus attached it urges the plugs into contact with the blade. The blade side of the plugs 19 are chamfered 21 to permit the initial insertion of the blade between them. FIGS. 1 and 2 also illustrate that a portion of the carriage body 2 is cut away to provide easy access to the honing stones. The access area 30 is achieved by cutting a lateral channel across the ends of the carriage body, which permits the stones to be grasped with the fingers.

FIG. 6 illustrates an alternate embodiment of the invention. In this embodiment, rod 7 is held stationary by a clamp 22 which is similar to clamp 14. The honing element is attached to a spindle 23 which is mounted to carriage 2 in the same manner as spindle 3, however, its interior is open to form a cam follower orifice 25 of substantially the same cross section of orifice 24. In this embodiment drive rod 7 remains laterally stationary as the carriage and spindle assembly is slid along the blades. The relative rotary motion developed between the drive rod 7 and the follower 25 during the sharpening strokes results in the rotation of spindle 23 and its associated honing element.

Rubber stop 26 protects the honing stone at the end of the sharpening stroke.

While the principles of the invention have been described in connection with the above specific apparatus, it is to be clearly understood that this description is made only by way of example and not as a limitation to the scope of the invention as set forth in the accompanying claims.

We claim:
1. A blade honing device comprising:
at least one rotating honing element, carriage means to slide said honing element along the edge of the blade edge to be honed;
means to rotatably attach said honing element to said carriage means, and
means responsive to the sliding movement of said carriage along the blade to rotate said honing element,
including drive cam means, and cam follower means in cooperative contact therewith to produce relative rotary movement between said cam and follower means in response to relative lateral motion therebetween, means for coupling one of said means to the blade and means for coupling the other of said means to said honing element.

2. The honing device of claim 1 wherein said means for attaching one of said means to the blade is comprised of clamp means to attach said helical drive cam means to the blade, and said means for attaching the other of said means to said honing element is comprised of means for attaching said cam follower means to said at least one rotating honing element.

3. The honing device of claim 2 wherein said drive cam means is comprised of a rigid twisted rod of generally rectangular cross-section the sides of which comprise flat parallel helical surfaces and said cam follower means is comprised of a rectangular enclosure the interior shape of which conforms to the cross-section of said twisted rod.

4. The honing device of claim 1 wherein said means for attaching one of said means to the blade is comprised of clamp means to attach said cam follower means to the blade, and said means for attaching the other of said means to said honing element is comprised of means for attaching said helical drive cam means to said at least one honing element.

5. The honing device of claim 4 wherein said helical drive cam means is comprised of a rigid twisted rod of generally rectangular cross-section the sides of which comprise flat parallel helical surfaces, and said cam follower means is comprised of at least one pair of rollers, means for positioning each pair of said rollers in contact with opposite sides of said twisted rod and upon parallel axles lying within a plane substantially perpendicular to the longitudinal axis of said twisted rod.

6. The honing device of claim 5 wherein said means for attaching said helical drive cam means to said at least one rotating honing element is comprised of;
a flexible spring coupling,
means for securing one end of said flexible spring coupling to one end of said twisted rod, and
means for securing the other end of said flexible spring coupling to said rotating honing element.

7. The honing device of claim 6 wherein said carriage means is comprised of;
a housing,
a recess along one side of said housing to receive the edge of the blade to be sharpened, and
means to retain said housing aligned with said blade edge as said blade is slid through said recess,
said means to rotatably attach said honing element to said carriage is comprised of, plain bearing means integral said housing the rotational axis of which is parallel to said recess,
shaft means complimentary to said bearing means and riding therein, to support said honing element for rotation within said housing, and
means to attach said honing element to said shaft means comprising means to retain said shaft within said bearing.

8. The honing device of claim 7 wherein said at least one rotating honing element is comprised of two cylindrical honing stones the outside diameter of which are complementary to the concave curvature of the blade edge to be sharpened, and said means to attach said honing element to said shaft is comprised of,
flange-nut elements cemented to the interior of each cylindrical stone which thread onto the ends of said shaft.

9. The honing device of claim 8 wherein means to retain said housing aligned with said blade is comprised of;
a plurality of pairs of opposing guide tabs of self-lubricating material,
a plurality of detents in the sides of the recess of said housing into which said tabs slidably fit, and
spring means attached to said housing and said tabs to urge said tabs into contact with the sides of a blade positioned to be sharpened.

10. The honing device of claim 5 wherein said means for positioning each pair of said rollers is comprised of,
a clamp, means to attach said clamp to the blade, two parallel axles for said rollers and
means for attaching said axles in extended relation to said clamp, which means is comprised of an offset cylindrical extension of at least one of said axle.

11. An ice skate blade honing device comprising
a rotating honing stone,
a carriage to slide said stone along the ice skate blade,
means to rotate said stone about said axis as said carriage is slid along said blade comprising
a rigid twisted cam rod the sides of which comprise parallel helical surfaces flexibly attached to said honing stone, a pair of V-shaped rollers adjacent mounted to form an opening therebetween conforming to the cross-section of said rod and through which said rod moves during the sharpening process,
whereby as said carriage, stone, and rod are moved along said blade, said rod and attached stone is caused to rotate by the interaction of said rod and said rollers having a V-shaped peripheral groove.

References Cited

UNITED STATES PATENTS

| | | |
|---|---|---|
| 451,515 | 5/1891 | Phillips. |
| 3,125,833 | 3/1964 | Wilde _____ 51—123 X |

FOREIGN PATENTS 143,861  10/1953  Sweden.

JAMES L. JONES, JR., Primary Examiner

U.S. Cl. X.R.

51—170